(12) United States Patent
Amiri et al.

(10) Patent No.: US 6,950,823 B2
(45) Date of Patent: Sep. 27, 2005

(54) TRANSPARENT EDGE-OF-NETWORK DATA CACHE

(75) Inventors: Khalil S. Amiri, Toronto (CA); Sriram Padmanabhan, Briarcliff Manor, NY (US); Sanghyun Park, Kyoungbuk (KR); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 10/328,229

(22) Filed: Dec. 23, 2002

(65) Prior Publication Data

US 2004/0133538 A1 Jul. 8, 2004

(51) Int. Cl.[7] ............................................. G06F 17/30
(52) U.S. Cl. ................................. 707/10; 707/2; 707/3
(58) Field of Search .................................. 707/2, 3, 10

(56) References Cited

U.S. PATENT DOCUMENTS

| | | | | |
|---|---|---|---|---|
| 5,897,632 | A | | 4/1999 | Dar et al. ........................ 707/2 |
| 6,275,819 | B1 | | 8/2001 | Carter ............................ 707/2 |
| 6,393,415 | B1 | * | 5/2002 | Getchius et al. ................ 707/2 |
| 6,601,062 | B1 | * | 7/2003 | Deshpande et al. ............. 707/3 |
| 2002/0083118 | A1 | | 6/2002 | Sim ............................ 709/105 |
| 2002/0116457 | A1 | * | 8/2002 | Eshleman et al. ............ 709/203 |
| 2004/0059719 | A1 | * | 3/2004 | Gupta et al. ................... 707/3 |

* cited by examiner

*Primary Examiner*—Jean M. Corrielus
*Assistant Examiner*—Chongshan Chen
(74) *Attorney, Agent, or Firm*—F. Chau & Associates, LLC

(57) ABSTRACT

A system, apparatus and method are provided for the dynamic caching of data based on queries performed by a local application, where the system includes a remote server having a complete database, a local database on an edge server including a subset of the complete database, the edge server in communication with the remote server, shared tables within the local database on the edge server for caching results from the complete database, receiving locally generated data, and adjusting the contents of the cache based on available storage requirements while ensuring consistency of the data between the local database and the remote database; the apparatus includes an edge data cache including a query evaluator, a cache index, cache repository, resource manager, containment checker, query parser and consistency manager all in signal communication with the query evaluator; and the method for a local server to satisfy a database query meant for at least one remote server includes dynamically caching results of previous database queries of the remote server, associating a local database with the local server, storing a plurality of the caching results in shared tables in the local database, and using the plurality of the caching results in satisfying a new database query with the local server.

12 Claims, 11 Drawing Sheets

TRANSPARENT EDGE-OF-NETWORK DATA CACHE

BACKGROUND

The present disclosure is directed towards database caching over distributed networks. The proliferation of distributed web applications is increasing the frequency of application queries to remote database servers. To improve the performance of such queries and enhance data availability, such applications can use a local database cache. For instance, an edge server in a content distribution network can use a nearby database cache to speed up data access and generate dynamic web content more quickly at the edge of the network.

Typical techniques to cache data on edge servers rely on either (i) explicit replication of the entire database or an explicit part of it on a local machine, or (ii) the caching of previous query responses and the exact-matching of new query statements against previously cached responses. In the replication approach, the contents of the cache are explicitly specified by an administrator who must determine which parts of the database tables are to be replicated on the edge node. Once the cache contents are specified, either as table name or a "materialized view" definition, the data is copied from the origin server to the edge cache.

In the query response caching approach, the cache is dynamically populated with the responses of application queries. The data in the cache is described by a list of query responses, with each response tagged with the query statement from which it was generated. A response is used to answer a subsequent query only if that query matches, typically through a string comparison, the query string corresponding to the cached response. Query response caches eliminate the need for administrator control by dynamically caching data, but store data inefficiently in separate regions, one region per query response. This induces a high space overhead as the same base data may be replicated in many query responses. This is because query responses often overlap, typically including a significant and common part of the underlying database. Furthermore, this approach leads to limited performance benefits because a cached query response is used only to satisfy an exact resubmission of the same query, but not other queries that may be contained in the response. For example, given an initial query to find the social security number of all employees who are less than 30 years old. The SQL statement would be:

SELECT employee.ssn FROM employee WHERE employee.age<30

Assuming that the response for this query is cached, and that the cache receives a new query to find the social security number of all employees who are less than 25 years old, that SQL statement would be:

SELECT employee.ssn FROM employee WHERE employee.age<25

Although the response of the new query is included in the response of the first since all employees that are less than 25 years old are also less than 30 years old, a query response cache based on exact-matching would not be able to service the query from the cache.

In summary, explicit administrator-defined data caching requires manual involvement and presumes that the administrator has intimate knowledge of the workload and the resources on each edge server. Query response caches eliminate administrator overheads, but suffer from limited effectiveness and high space overhead. Furthermore, consistency management becomes complex because of the mismatch between the representation of the cached data and the base data in the origin server. Consistency control generally requires either invalidating all query responses when any base tables change, or maintaining complex dependency graphs.

It is therefore desirable to have a cache that does not require an administrator to specify its contents, or to adapt that specification according to changes in the workload or to changes in the availability of resources on the machine where the cache resides. It is further desirable for the cache to be efficient in storage overhead and in consistency maintenance.

SUMMARY

These and other drawbacks and disadvantages of the prior art are addressed by a computer system and corresponding method for supporting the dynamic caching of data based on queries performed by a local application.

An exemplary system includes a remote server having a complete database, a local database on an edge server including a subset of the complete database, the edge server in communication with the remote server, shared tables within the local database on the edge server for caching results from the complete database, receiving locally generated data, and adjusting the contents of the cache based on available storage requirements while ensuring consistency of the data between the local database and the remote database.

An exemplary apparatus includes an edge data cache including a query evaluator, a cache index, cache repository, resource manager, containment checker, and query parser and consistency manager all in signal communication with the query evaluator.

A exemplary corresponding method for a local server to satisfy a database query meant for at least one remote server includes dynamically caching results of previous database queries of the remote server, associating a local database with the local server, storing a plurality of the caching results in shared tables in the local database, and using the plurality of the caching results in satisfying a new database query with the local server.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a transparent edge-of-network data cache in accordance with the following exemplary figures, in which.

DETAILED DESCRIPTION OF PREFERRED EMBODIMENTS

Figure 1:
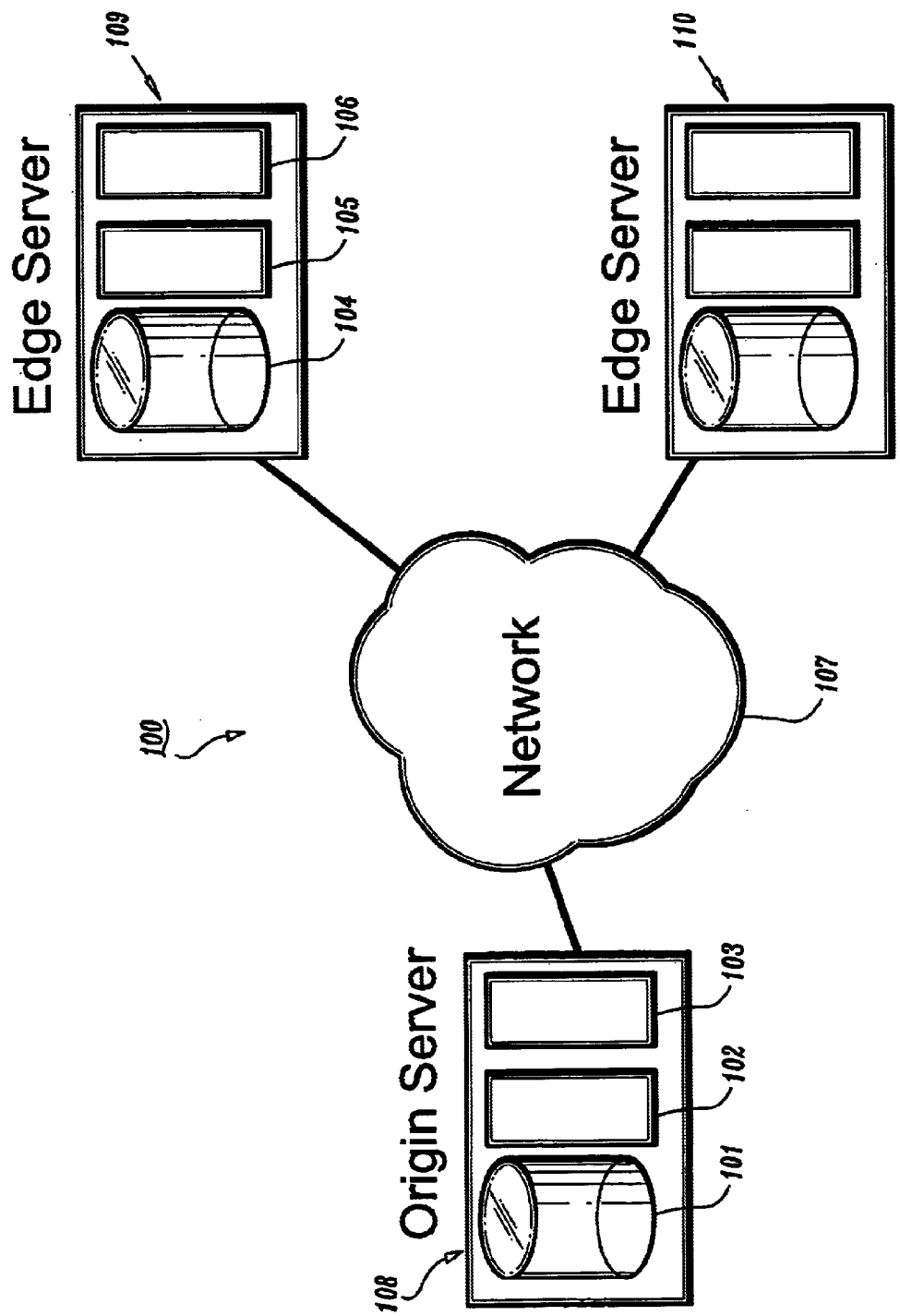
FIG. 1 shows a schematic diagram of two edge servers connected to an origin server.

Embodiments of the present disclosure provide a dynamic database cache allowing database queries meant for remote servers to be serviced by a local machine. The cache utilizes a local database engine to maintain partial but semantically consistent "materialized views" of previous query results. It is dynamically populated based on the application query steam. A containment checker operating on query predicates is used to establish whether the results of a new query are contained in the union of cached results. Common local tables are used to share physical storage among overlapping query results where possible. Data-consistency is maintained by propagating inserts, deletes and updates from the origin database to their cached local counterparts. A background cleaning algorithm continually or periodically prunes the contents of common local tables by evicting excess rows propagated by the consistency protocol as well as rows belonging to queries marked for eviction from the cache. The terms "query response" and "query result" are used interchangeably in this disclosure.

In the description that follows, the following definitions may aid understanding of the principles and/or operation of the exemplary embodiments:

Database table: A relational table as defined by a relational database system.

Query predicate: The constraint specified in the query (e.g., the WHERE clause in an SQL statement), which is used as the criterion to select which rows in the base table are returned in the query result.

Query result: The response returned by an SQL query to a database system. A query result looks like a table with rows and columns.

Set of query results: A plurality of result sets corresponding to multiple queries.

Delta consistency: The requirement that the data in a database cache be consistent within a given time window with respect to the data in the origin database. Precisely, it means that the state of the cached data at current time Tc is consistent with a past state of the origin database at time Tp, where Tp is within a predefined maximum time window.

Query/Transaction timestamp: A unique server-generated number that is monotonically increasing and that is associated with all queries and transactions that execute at the origin server. The timestamp reflects the serialization order of the transaction or query with respect to concurrent operations.

Refresh message: A message sent by the origin server to the edge cache reflecting recent changes (e.g., insert, update, delete statements) to tables in the origin database. Changes to the base tables may be batched in multiple refresh messages, but the refresh messages are propagated in the order in which the changes they report have occurred.

Immediate update visibility: The property that an application query, following the successful completion of an update by the same application, must observe the effect of the update on the database.

Monotonic state transitions: The property that two successive queries submitted by an application to a cache, where the second query is submitted after the response to the first one has been received, would observe a database state that moves forward in time. That is, the second query would observe a database state that is as recent or more recent in time than the state observed by the first query.

As shown in FIG. 1, an exemplary network embodiment with an "edge data cache" is indicated generally by the reference numeral 100. The network 100 may be a part of a bigger application system. The network 100 includes two edge servers 109 and 110 connected to client machines performing web requests, and also connected to an origin server 108 where a main database and web site are hosted via a network connection 107. The origin server 108 includes a database 101, an application server 102 and a web server 103. The edge servers 109, 110 each include an application server 105 and a web server 106. The edge server, however, does not have a replica of the entire database as stored in the origin site. Instead, it uses a novel edge data cache 104. Requests for dynamic content are received by the edge server and handled by application components hosted inside the edge application server 105. These components issue database queries, which are intercepted by the edge data cache 104 and handled from the local database, if possible. If the query can not be handled by the local database, the edge data cache 104 forwards the request to the origin database 101 and retrieves the results from there.

Figure 2:
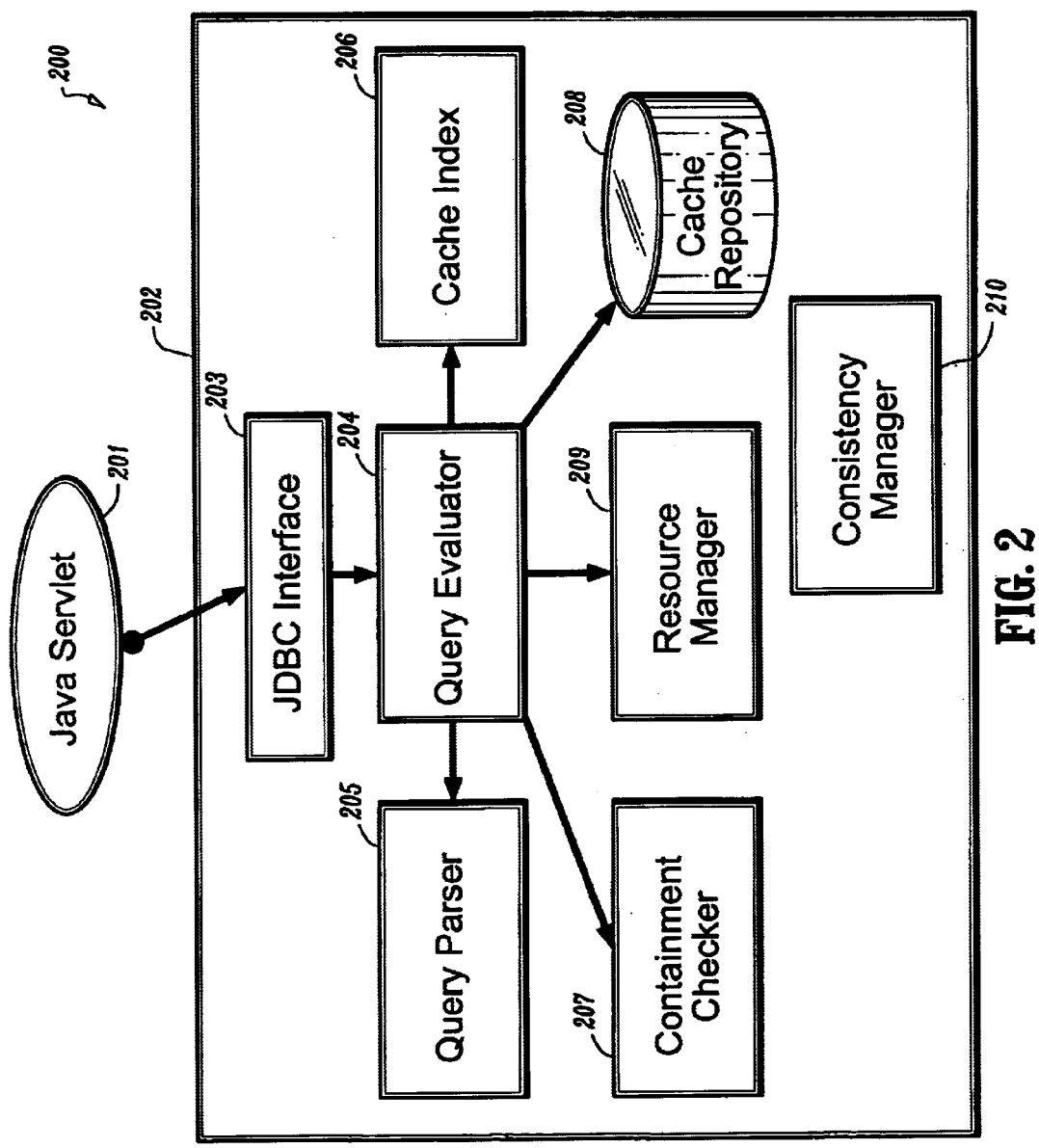
FIG. 2 shows a block diagram of a data cache of an edge server of FIG. 1.

Turning to FIG. 2, an edge data cache is indicated generally by the reference numeral 200. The edge data cache 200 includes a Java servlet 201 coupled with a main portion 202. The main portion 202 includes a JDBC interface 203 coupled in signal communication with a query parser 205, a containment checker 207, a query evaluator 204, a cache index 206, a local repository 208, a consistency manager 210, and a resource manager 209. The cache functionality is implemented in the following components:

The query parser 205 converts the SQL string into a "query statement" data structure, a parse tree identifying the list of columns, the target tables, as well as the various clauses accessed by the query. In particular, the WHERE clause is parsed into a Boolean predicate that is stored in an AND-OR normal form. This allows for equivalence and containment operations to be performed on pairs of query predicates by the containment checker.

The query containment checker 207 determines if the results of a new query are included within those of previously cached queries. Containment could be checked as an exact match against an earlier query, a proper subset of an earlier query or a proper subset of a union of multiple earlier queries.

The cache index 206 provides for containment checking. Containment checking can be computationally expensive when the query predicates are complex or the set of cached queries is too long. When a new query is received, instead of checking against all previously cached queries, it focuses only on the queries that operate on the same table(s) and columns. The cache index organizes the cached queries in a multi-level hash table based on table name and column names.

The query evaluator 204 is the core module of the cache and includes the caching logic. It determines whether an access is a hit or a miss, and whether the results returned by the back-end upon a miss should be inserted in the cache. It may also rewrite the queries that miss in the cache before passing them to the back-end to prefetch data and improve cache performance.

The resource manager 209 maintains statistics about hit rates and response times, and maintains cache configuration parameters. It can change the configuration parameters to adapt to certain workloads if the collected statistics indicate such a need.

The cache repository 208 stores results. The results of the query, on a cache miss, are stored in a local database table as determined by the cache evaluator. Embodiments of the present disclosure use a hybrid physical storage policy. Some queries use a table per query-result model, while others share physical storage through partially populated local replicas of back-end base tables.

The consistency manager 210 applies updates to locally cached data in response to refresh messages received from the back-end database.

In operation, a query originates from the application or application component, such as a Java servlet 201. The query is received by the database cache 202. Specifically, a JDBC interface adaptor within the cache 203 is responsible for interfacing with applications. The interface adaptor is an implementation of a set of classes defined and required by the Java JDBC standard. The "query statement" is then passed to the query evaluator 204. The query evaluator is the module responsible for deciding whether to execute the query locally or remotely and for controlling the operation of the cache. Upon receiving a query statement, the query evaluator parses the received statement by invoking the query parser 205. The parser classifies the statement into one of four categories. The processing of the statement depends on its query category.

Figure 3:
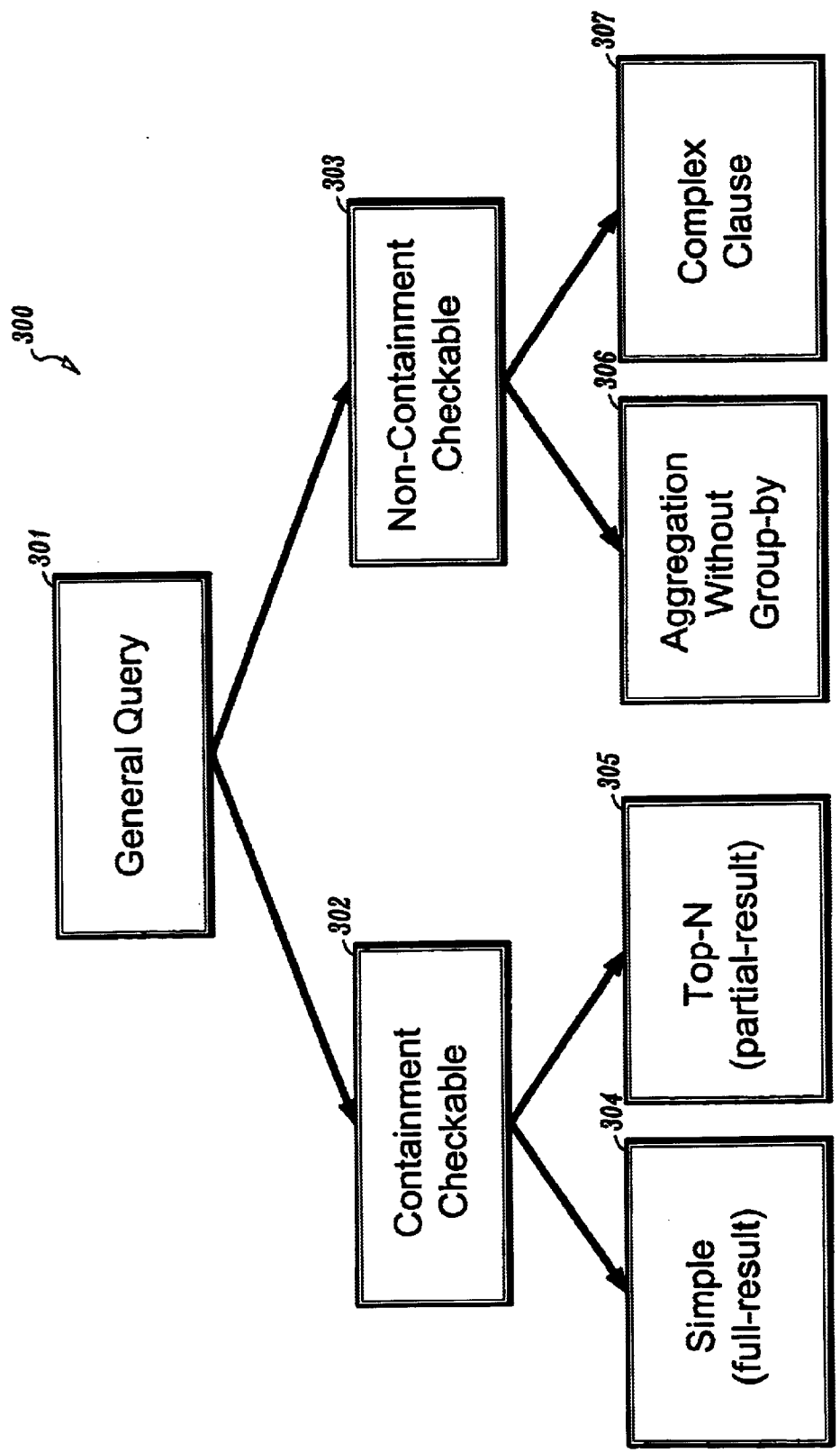
FIG. 3 shows a tree diagram of the different classes of queries in an edge server database cache of FIG. 2.

Turning now to FIG. 3, a query tree is indicated generally by the reference numeral 300. The query tree 300 shows the different query categories. Queries received by the cache 301 are organized into two classes, containment-checkable queries 302 and non-containment-checkable queries 303. A cached containment-checkable query can satisfy any subsequent query whose results can be proved to be a subset of the cached query's results. Queries that operate on a single table or join multiple tables but include no group-by clause and no aggregation operators are cached as containment-checkable queries. They can be divided further into two categories, full-result or simple queries 304 and partial result or Top-N queries 305.

Non-containment-checkable queries can be cached but matching is performed using the exact matching of the SQL string. They are further divided into two categories: aggregated 306 and complex 307 queries. Complex queries that use UDFs, sub queries or group-by clauses are not handled by the containment checker and are cached as exact-matches. Queries that aggregate data using the aggregation operators such as MIN, MAX and AVG in their select list are also cached as exact-matches. However, aggregated queries 306 can be converted to a containment-checkable query 302 by dropping the aggregation operator in their select list. This optimization is performed by the cache when the estimated benefit is significant.

The processing of simple queries proceeds as follows. Simple queries are those whose results are a subset of the rows and columns of a base table. Simple queries therefore do not have any "GROUP BY" clauses, sub queries, or user-defined functions. They are not Top-N queries and simply select a part of a single table, or a join of multiple tables, based on a WHERE clause using basic comparison primitives. An example of a simple query is given below:

SELECT employee.id FROM employee WHERE employee.age<25

Figure 4:
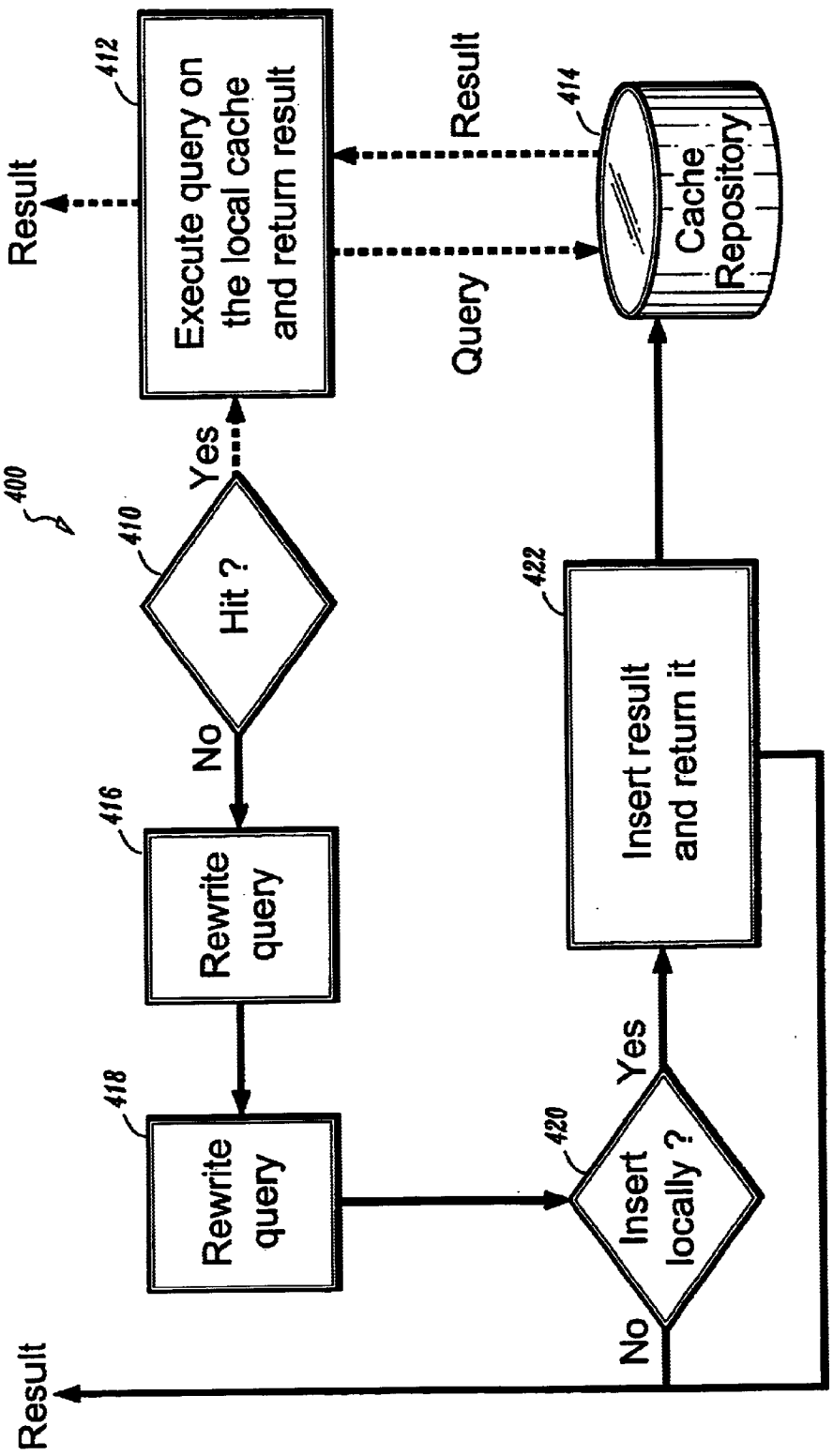
FIG. 4 shows a flow diagram of the overall query processing for an edge server of FIG. 1.

As shown in FIG. 4 a high-level processing algorithm is indicated generally by the reference numeral 400. The high-level processing algorithm 400 provides for processing a cache hit or a cache miss. Upon receiving a query, the cache index is used to retrieve the queries that are on the same table list and column list. Then, the containment checker is invoked to establish if this query is included in these previously cached queries at a decision block 410.

In case of a cache hit, a query is executed on the local cache and a result returned at a function block 412. The function block 412 also sends the query to a cache repository 414, from which it receives the result. In case of a cache miss, the query is rewritten at function blocks 416 and 418 before sending it to the back-end server. The following optimizations are performed. First, the select list is expanded to include the columns mentioned in the WHERE-clause, order-by-clause, and having-clause. The goal of this expansion is to maximize the likelihood of being able to execute future queries that hit in the cache. Second, the primary key column is also added to the select list. Caching the primary key column is needed to prevent duplicate rows from being inserted in the cache, when multiple queries with overlapping results retrieve the same rows of the same base table. Results returned by the back-end are not always inserted in the cache upon a miss. Sophisticated history-based algorithms can be used at a decision block 420 to decide which queries are worth caching at a function block 422. The results are provided as output and sent to a cache repository 414.

The processing of Top-N queries proceeds as follows. Top-N queries fetch a specified number of rows from the beginning of a result set which is usually sorted according to an order-by clause. The query containment and evaluation algorithm differs from that of simple full-result queries. Top-N queries are converted to simple queries by dropping the Fetch clause. Containment is performed on these simple queries as explained above. In a final step, the Fetch clause is considered. Note that although the base query (without the Fetch clause) is a cache hit, the Fetch clause may make it a cache miss. For example, consider the two queries Q1 and Q2 below:

Q1: SELECT id FROM item WHERE cost<15 ORDER BY cost FFNRO 20

Q2: SELECT id FROM item WHERE cost<5 ORDER BY cost FFNRO 20

If the FETCH FIRST 20 ROWS ONLY algorithm ("FFNRO 20") clauses were absent from both queries, then the second query's result would be included in the results of the first query, i.e., a cache hit. However, when the clauses are present, a cache hit is not guaranteed by mere inspection of the query statements. Thus, the second step in processing the containment checking for a Top-N query is to attempt local execution on the cached data. If enough rows are retrieved, then the query is considered a cache hit, otherwise it is considered a cache miss. This type of a cache miss is called a "partial hit", since only a part of the result is found in the local cache.

If a containment check does not find any matching queries or the result set does not have enough rows, the original query QN is converted into a modified query QN', where the value of N in the Fetch clause is replaced by a larger N'(N'=N*Expansion-Factor). For example, the default factor value in the experiments was 2, fetching double the number of rows requested. Retrieving more rows than the application requested is a heuristic aimed at reducing the event of later "partial hit" queries, i.e., queries that pass the containment check step but fail to find the required number of rows.

The processing of aggregate queries proceeds as follows. Aggregated queries have an aggregation operator (e.g., MAX, MIN, AVG, SUM) in their select list and would otherwise be containment-checkable. Consider the following query, Q3:

Q3: SELECT MAX(cost) FROM item WHERE id=10

The matching for a hit proceeds in two steps. First, a check is made for an exact match for Q3 based on the SQL string and the entire result set is returned to the application. Next, if no exact match was found the original query Q3 is modified into the query Q4 by removing the aggregation operators:

Q4: SELECT cost FROM item WHERE id=10

If a containment match is found for the modified query Q4, the original query Q3 is executed on the local cache, aggregating the cost locally, and returning the results to the application. On a miss, the modified query Q4 is executed at the back-end. If the result set size is within a threshold the results are stored in the corresponding local table and the original query is executed locally. This enables future queries with a different aggregation operator to be serviced from the cache. If the result set size turns out to be too large, the original query Q3 is sent to the back-end and the results stored in a new exact-match table. This allows any future query with the exact same aggregation condition to be serviced from the cache. This heuristic aims at increasing cache hits without unduly increasing cache size.

Complex queries are not containment-checkable either because of complex clauses (e.g., a user-defined function or a sub query in the WHERE clause) or because of a group-by clause. A group-by clause generates aggregate data that can be used only by queries that have the exact same group-by clause and WHERE clauses. As such, containment checking is inadequate. Instead, the results of such queries are stored in separate result tables, indexed by the query's SQL string. The containment check for such queries is based on an exact match of the SQL strings. This lookup process is very fast as it is based on a hash table with the SQL string as a key. If the exact SQL string is submitted to the cache, a local query is executed on the corresponding result table to retrieve the entire table (i.e., "SELECT*FROM LOCTAB" is executed locally). Note that such queries are inexpensive, having minimal processing time on the edge server.

Figure 5:
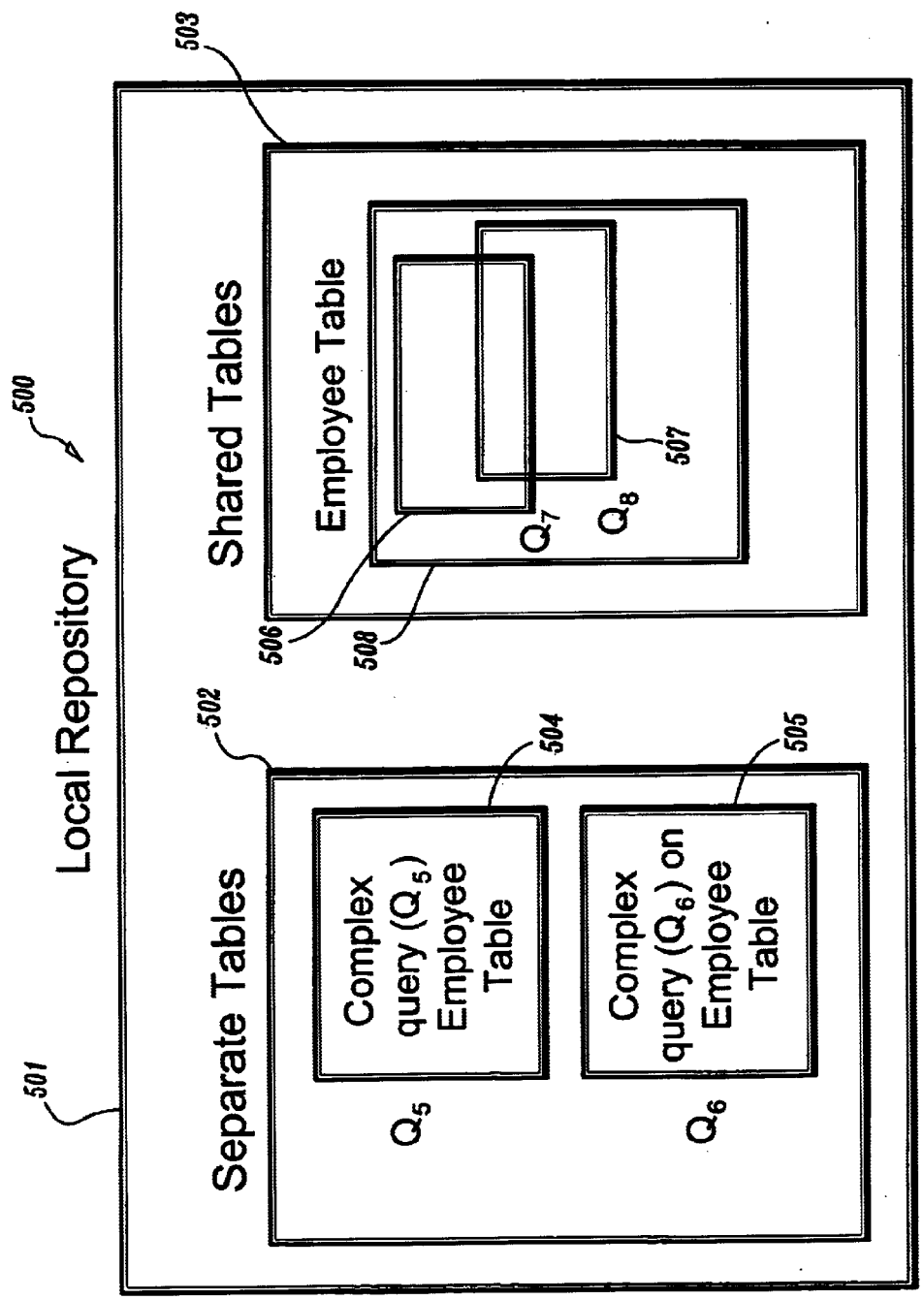
FIG. 5 shows a schematic diagram of a common-schema shared storage technique employed by a data cache of FIG. 2.

Turning to FIG. 5, a local repository is indicated generally by the reference numeral 500. The local repository 500 shows how query results are stored in a local cache repository 501. The repository 501 is divided into two partitions, one for the storage of complex or exact-match queries 502, and another for the storage of containment-checkable queries 503. Exact-match queries are stored in separate tables, and are used only to answer new queries whose specification matches the SQL string of the cached query. For example, queries Q5 504 and Q6 505 are stored in separate tables, regardless of whether their results overlap or not.

Containment-checkable queries are stored in shared tables. Queries over the same base table are stored in the same local copy of the table. For example, the figure assumes that the two queries Q7 and Q8 "SELECT" from the same table. The tuples retrieved by the query Q7 506 are inserted in the cache first. Then, the rows fetched by the second query Q8 are inserted 507 in the same table. When the results of the Q8 are inserted, existing rows are updated with the new fetched values. So, the same rows fetched by two different queries are not duplicated in the cache. Identical rows are discovered because all queries are rewritten to fetch the primary key before sending them to the back-end server.

Figure 6:
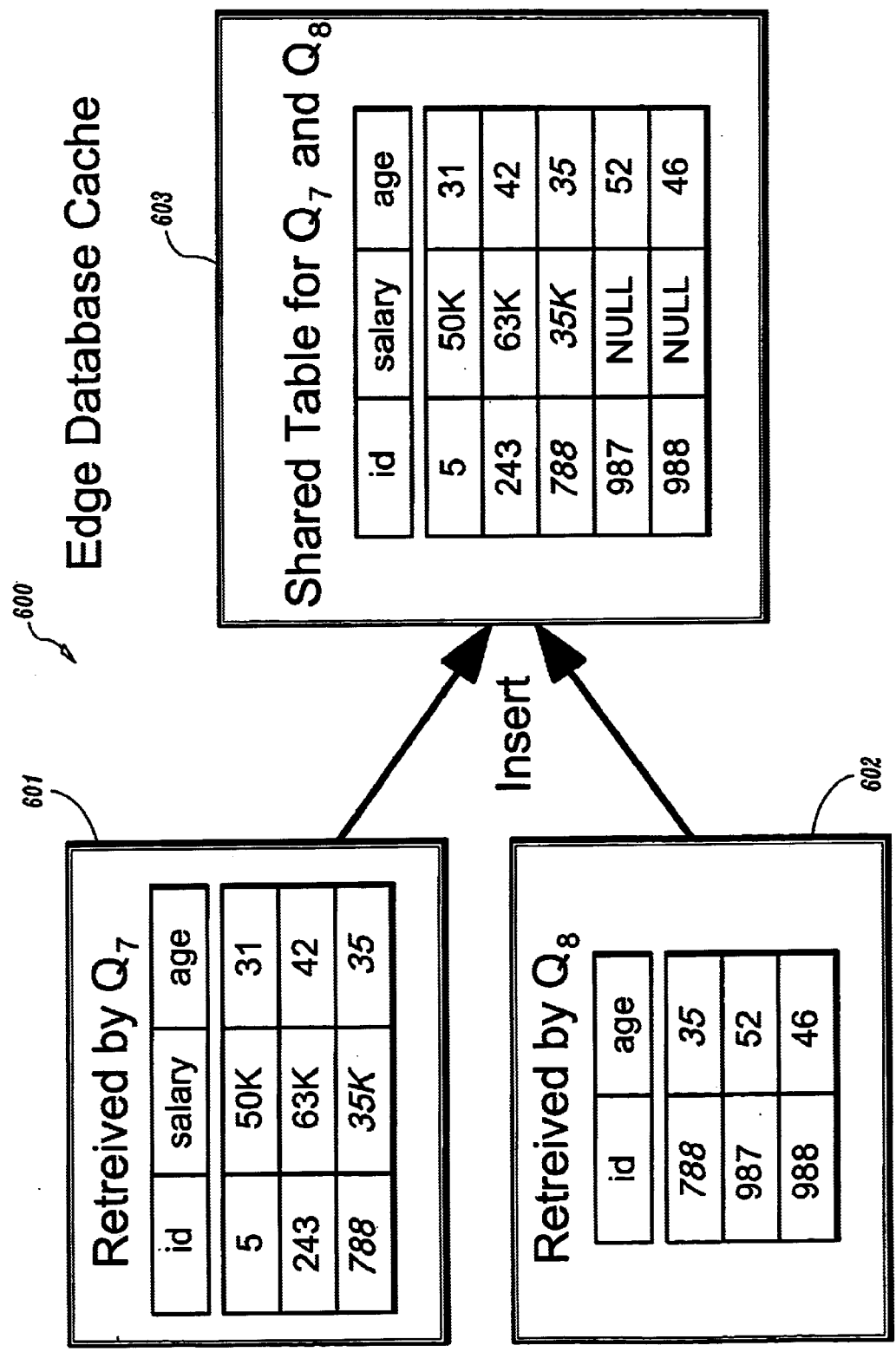
FIG. 6 shows data table examples for two queries over the same table in an origin server of FIG. 1.

Turning now to FIG. 6, a cache table structure is indicated generally by the reference numeral 600. The cache table structure 600 shows a particular example of two queries over the same data table, here called "employee", and shows how their results data structures 601, 602 are stored in the same local table 603 in the edge database cache.

Figure 7:
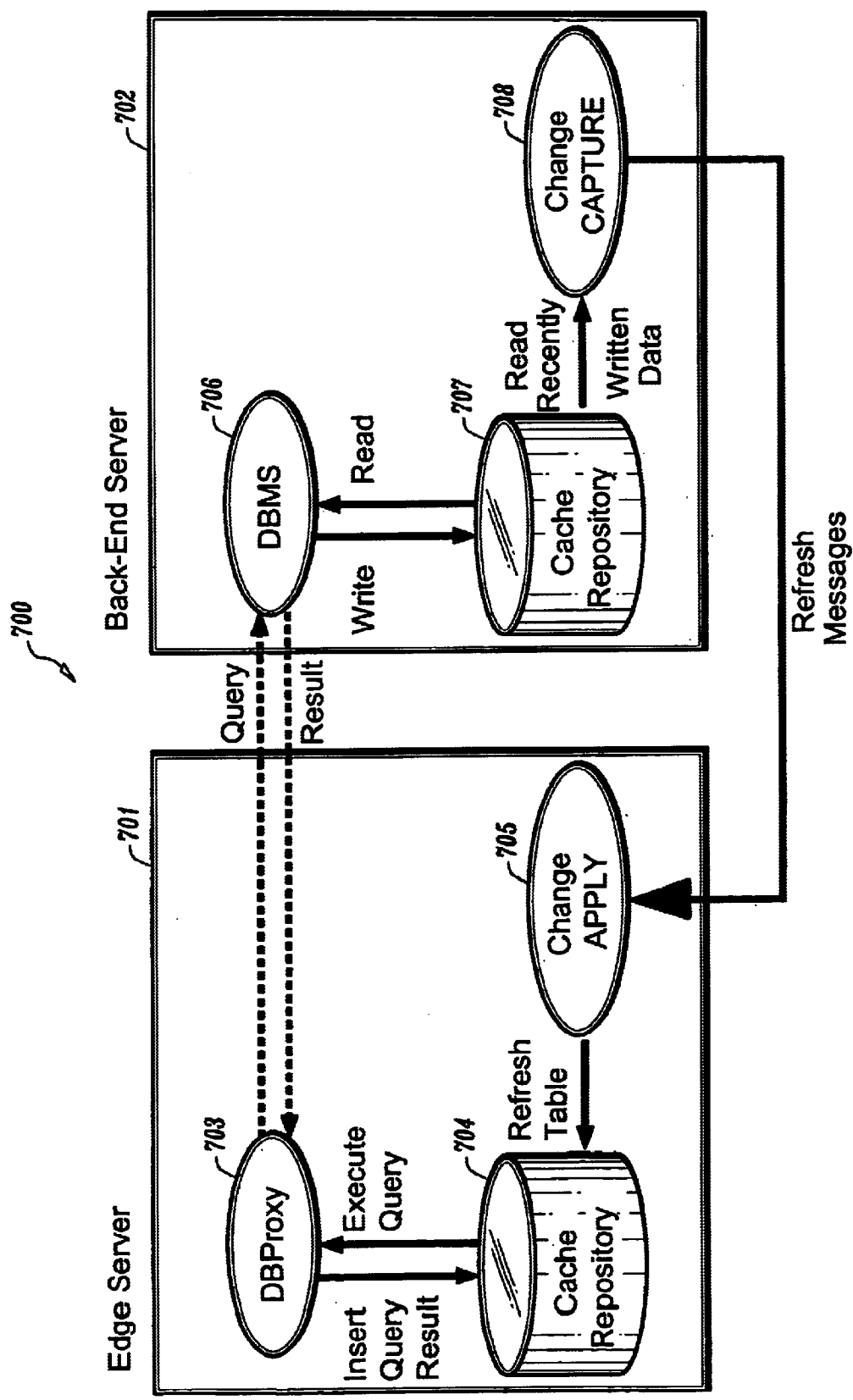
FIG. 7 shows a schematic diagram for a consistency maintenance protocol.

As shown in FIG. 7, a consistency protocol is indicated generally by the reference numeral 700. The consistency protocol 700 includes an edge server portion 701 in signal communication with a back-end server portion 702. The edge server portion 701 includes a DBProxyÔ unit in signal communication with a cache repository 704 for inserting a query result and executing a query. A change APPLY unit 705 is in signal communication with the cache repository 704 for refreshing the table.

The back-end server portion 702 includes a DBMS unit 706 in signal communication with the DBProxyÔ unit 703 for receiving a query and providing a result. The DBMS unit 706 is further in signal communication with another cache repository 707 for writing to and reading from the cache repository 707. The cache repository 707 is in signal communication with a change CAPTURE unit 708 for reading recently written data. The change CAPTURE unit 708, in turn, is coupled in signal communication with the change APPLY unit 705 for refreshing messages.

Thus, data consistency is ensured by subscribing to a stream of updates propagated by the origin server. Traditional materialized view approaches update cached views by re-executing the view definition against the change ("delta") in the base data. The edge data cache requires a more efficient mechanism, however, because of the potentially large number of queries ("views") that it caches. Since cached data is maintained as partially populated copies of back-end tables, changes committed to the base tables at the origin can be simply propagated "as is" to the cached versions, without the need to reexecute the queries. Updates, deletes and inserts ("UDIs") to base tables are propagated and applied to the partially populated counterparts on the edge. Future queries that will execute over the cache will retrieve from these newly propagated changes any matching tuples. This solution presumes slowly changing data, typical of most web environments, and trades off potentially unnecessary data propagation for lowering the processing overhead of determining how the cached views should be updated. However, when a table is undergoing a heavy update workload, the cache resource manager can disable the local copy for a specified period.

Read-only queries issued by edge applications are satisfied from the cache whenever possible. Update transactions are always routed to the backend database for execution, without first applying them to the local cache. Because edge data caches are designed for large-scale deployment, the consistency protocol must be as loosely coupled from the origin as possible. Consequently, the onus of ensuring cache consistency should fall as much as possible on the edge caches, where resources scale more naturally. The back-end server should only be responsible for periodic update propagation, a task that can be offloaded to a separate process or machine. While providing strong consistency guarantees could induce a high cost that would limit cache effectiveness, it is presently described how some important consistency guarantees, such as immediate update visibility and delta-consistency, can be ensured. The present disclosure relies on a data propagator, which captures all UDIs to the tables at the origin and forwards them packaged in "refresh messages" to the edge caches. Data changes are propagated to the edges tagged by their transaction identifiers and applied to the edge cache in transaction commit order. The stream of incoming UDIs, reflecting the effects of transactions committed at the origin site, is applied to the locally cached tables.

Since UDIs are propagated and applied to the cache in timestamp order. All timestamps used in this section refer to the back-end server side commit timestamps, the value of the tuples in the cache must reflect the state of the database corresponding to the timestamp of the last propagation message from the origin. More precisely, the timestamp of a propagation message is the largest timestamp of any update transaction included in that message. The challenge, in ensuring delta-consistency arises because local tables can be updated by propagation messages as well as by query result inserts on a miss.

Guaranteed consistency properties. The cache guarantees several important consistency properties for edge applications, namely delta-consistency, monotonic transitions, and immediate update visibility. The cache appears to applications as the real back-end database. However, its contents are not usually as current as those stored in the back-end database. Thus, the cache "exports" a given state of the database because it reflects to applications a state that can be different from the current state. The property of delta-consistency requires that the state of the database exported by the cache at time always correspond to a past state of the database at a previous point in time. The lag between the exported state and the actual state is also limited. The property of monotonic state transitions implies that the state of the database exported by the cache moves only forward in time. The property of immediate update visibility requires that if an application commits an update and later issues a query, the query should observe the effects of the update (and all previous updates).

Guaranteeing delta-consistency and monotonic transitions. Suppose that initially, the cache is consistent with the database state of one minute ago. If the result of a fresh query that missed in the cache and executed at the origin were inserted, the cache would include a mix of stale and fresh data. Delta-consistency requires that cached data is always consistent with a single past version of the database. Assume that a query executes atomically at the origin. When a query misses and executes remotely, the server returns it's last commit timestamp, tq when the query executed, along with the results.

Figure 8:
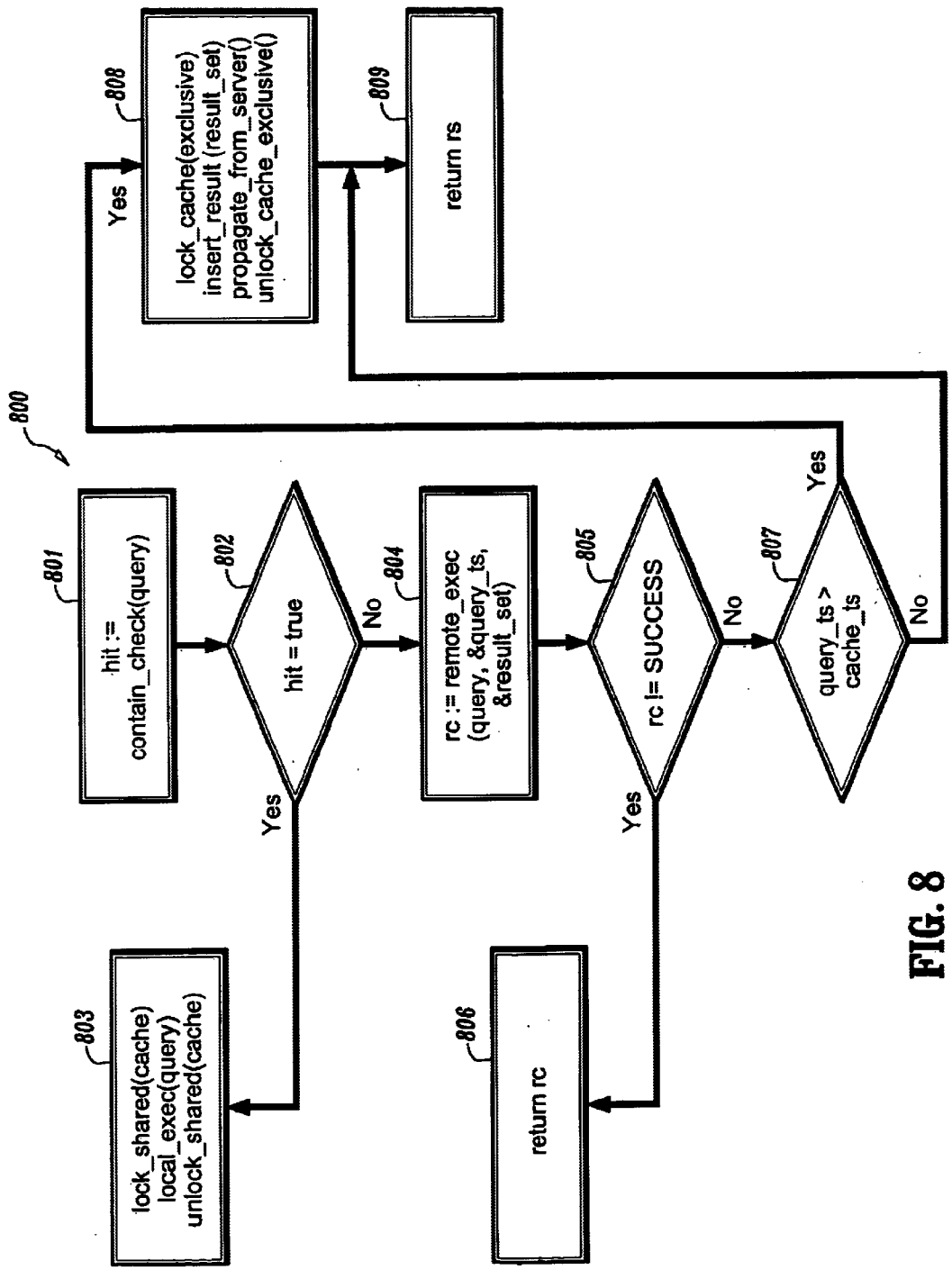
FIG. 8 shows a flow diagram for a query-processing algorithm with consistency taken into account.

Turning to FIG. 8, a query-processing algorithm is indicated generally by the reference numeral 800. The query-processing algorithm 800 takes consistency into account, and includes a function block 801 for registering a cache hit based on a containment check of the query. The function block 801 passes control to a decision block 802 for determining whether a hit occurred. If a hit did occur, control is passed to a function block 803 to perform a lock of the shared cache, a local execution of the query, and an unlock of the shared cache. However, if a hit did not occur at block 802, then control is passed to a function block 804 to execute the query remotely, and, in turn, to pass control to a decision block 805. The block 805 determines whether the remotely executed query was unsuccessful. If yes, then control passes to a return block 806 to return the cached result "rc". If no, control passes to a decision block 807 to determine whether the result is only partial. If yes, then control passes to a function block 808 to lock the cache exclusively, insert the result into the result set, propagate the additional information from the server, and unlock the cache. The function block 808 passes control to a return block 809 for returning the result set "rs". If the result of block 807 is false or no, then control passes directly to the return block 809.

In operation, the result insertion starts by comparing the query's timestamp to the timestamp of the last propagation message received from the origin server, cache_ts at block 807. Note that the query and cache timestamps are referred to by their long names, query_ts ("tq") and cache_ts ("tc"), respectively, in the figures and by their long or short names elsewhere. If query_ts is greater than cache_ts, then the query has observed a more recent state than that of the cache. In this usual case, the results of the miss are first inserted, and any pending propagation messages are pulled from the origin server to fast-forward the entire cache to a later time at block 808. Finally, the query is added to the index. If, however, cache_ts is greater than query_ts, inserting the results of the miss immediately could revert cached data to past values, reversing changes applied by the propagation message and failing the monotonicity requirement. Since this is a race condition that is rare, insertion of the result may be skipped in such cases. This will usually only delay caching the query until one of the subsequent misses succeeds in inserting the results, and does not seriously compromise cache effectiveness. Note that as a side effect of propagate_from_server( ) in block 808, cache_ts may be increased.

Figure 9:
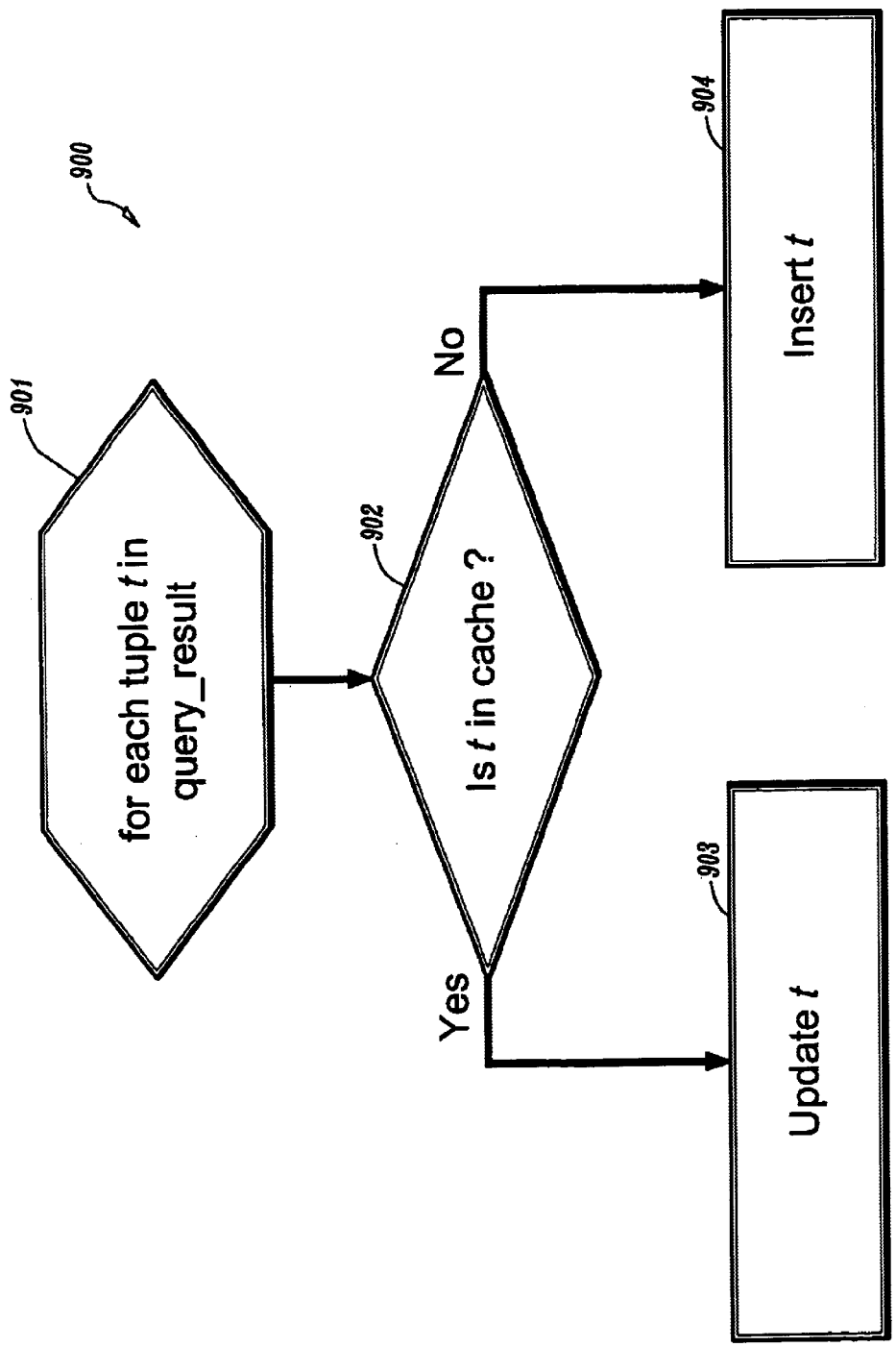
FIG. 9 shows a flow diagram for an algorithm for inserting results into a cache.

Turning now to FIG. 9, an algorithm for inserting results into a cache is indicated generally by the reference numeral 900. A looping block 901 executes a loop for each tuple in the query result. The loop for the block 901 includes a decision block 902 for determining whether the tuple is in the cache. If the tuple is in the cache, then control passes to a function block 903 to update the tuple. If the tuple is not in the cache, then control passes to a function block 904 to insert the tuple. Thus, in operation, the insertion of a result set into the cache proceeds as follows: When inserting a result set in the cache, existing rows are overwritten with the new values at block 903, while non-existing rows are inserted in the table at block 904.

Figure 10:
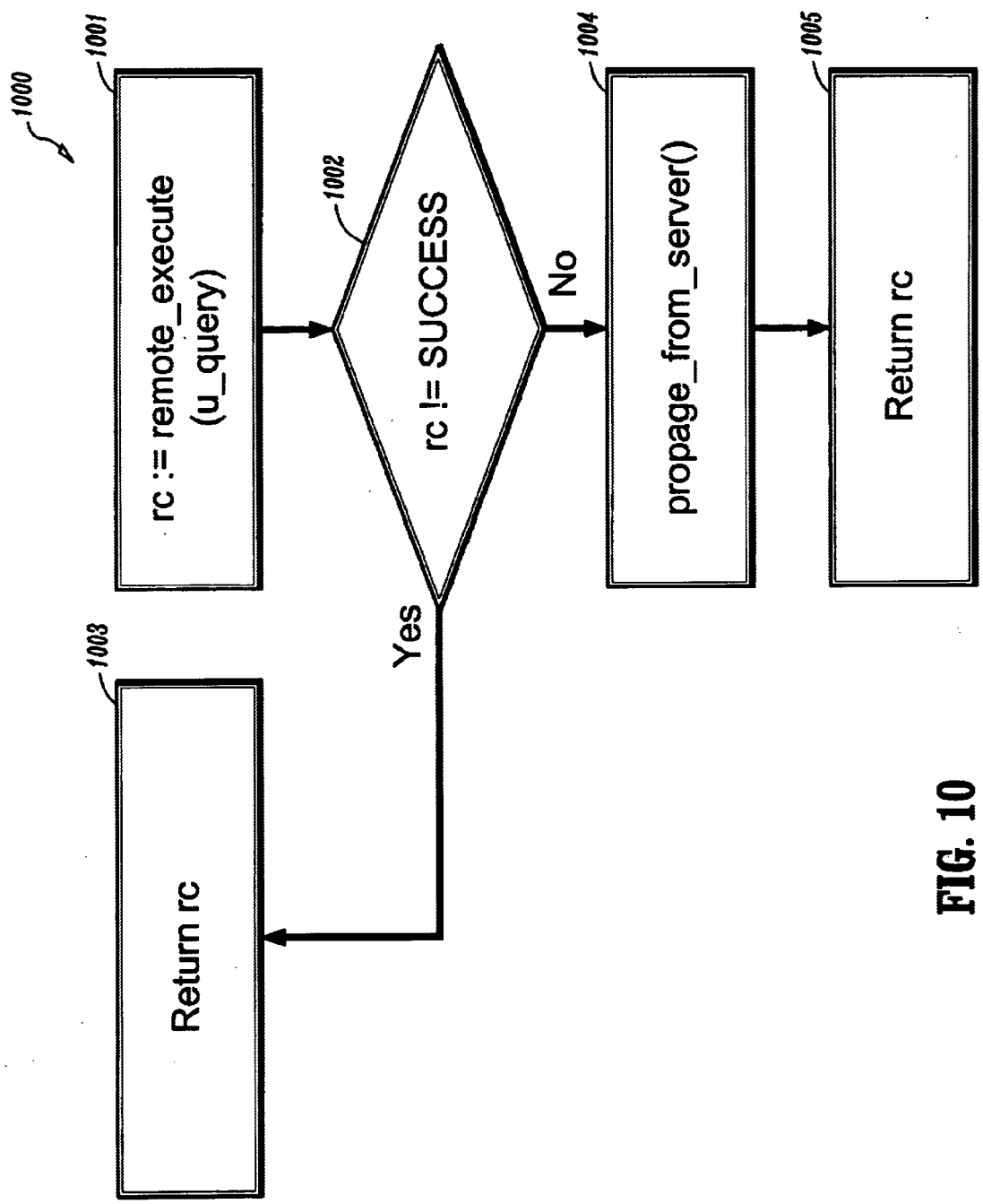
FIG. 10 shows a flow diagram for an algorithm for executing update transactions.

As shown in FIG. 10, an algorithm for executing update transactions is indicated generally by the reference numeral 1000. A function block 1001 executes a remote query for the result "rc", and passes control to a decision block 1002. If the query is successful, the block 1002 passes control to a return block 1003 for returning the result "rc". If the query is unsuccessful, the block 1002 passes control to a function block 1004 for propagating the data from the server. The block 1004 passes control to a return block 1005 for returning the result "rc".

Immediate update visibility is thus guaranteed. Update transactions submitted by an edge application to the cache are routed to the origin database 1001. Furthermore, after an update transaction completes, the effects of the update can be quickly fetched by pulling them from the origin 1004 before returning to the application.

Cache space overhead is adjusted by cache replacement. To limit space overhead and optimize the usage of usually limited edge resources, the edge data cache relies on a background garbage-collection process that evicts unused data from the cache safely, while preserving data consistency. Specifically, the goal of cache replacement is to maximize the benefit of the cache for a limited amount of available space. In contrast to traditional replacement of files and memory pages, the underlying rows can be shared across multiple queries.

Cache replacement is triggered when the space usage of the local database reaches a high watermark ("HWM") value. The replacement then begins until space is sufficiently freed and reaches below a low watermark ("LWM") value. The replacement is not triggered on demand on a query miss when there is no space to insert more rows in the local tables or to create a new table. Replacement is a background process and can be expected to proceed concurrently with query servicing and update operations.

Figure 11:
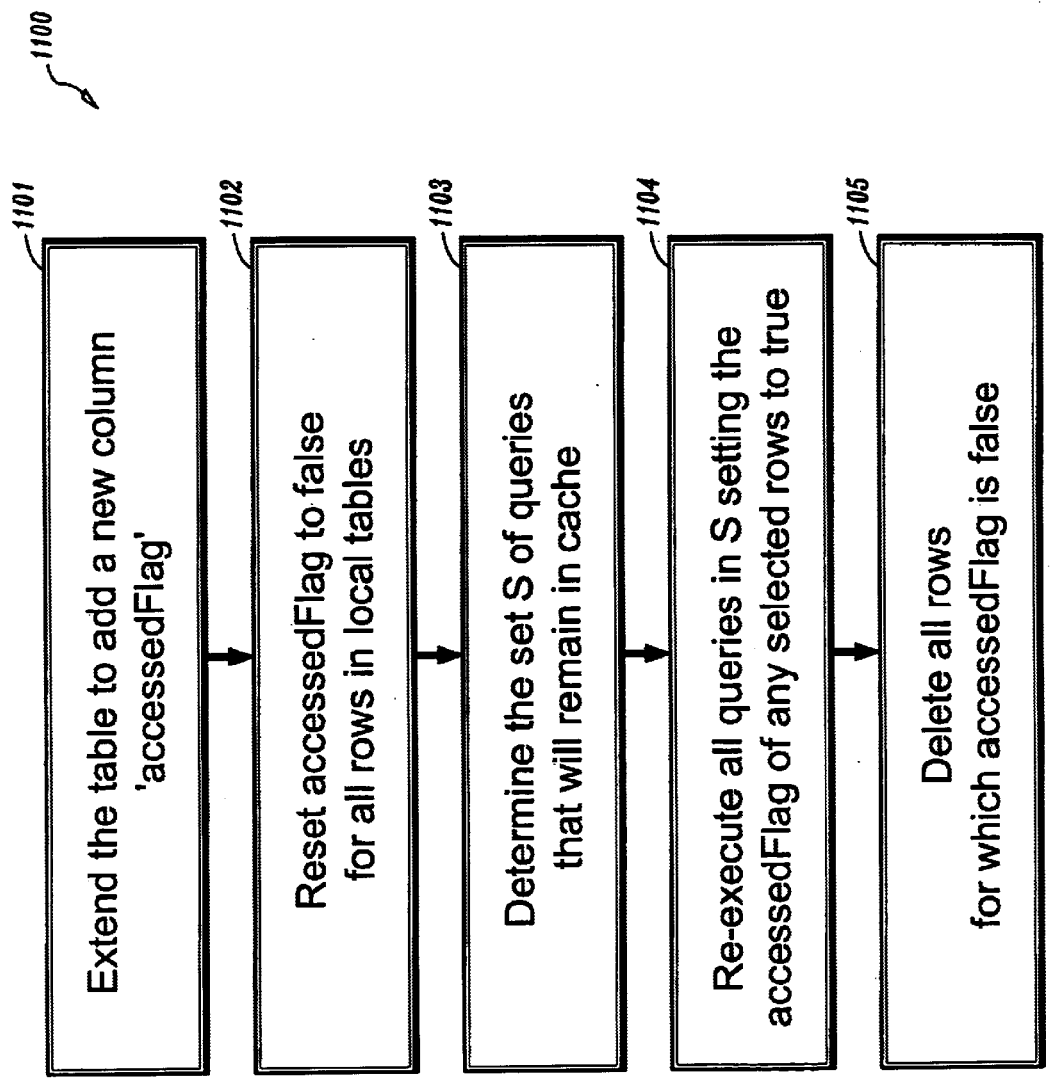
FIG. 11 shows a flow diagram for a background cache-cleaning algorithm used to adjust the space occupied by the cache.

Turning to FIG. 11, a cache-cleaning algorithm is indicated generally by the reference numeral 1100. The algorithm 1100 includes a function block 1101 for extending the table to add a new column 'accessedFlag'. The block 1101 passes control to a function block 1102 for resetting 'accessedFlag' to false for all rows in the local tables. The block 1102 passes control to a function block 1103 for determining the set 'S' of queries that will remain in the cache. The function block 1103, in turn, passes control to a function block 1104 for re-executing all queries in the set 'S' and setting the 'accessedFlag' of any selected rows to true. The block 1104 then passes control to a function block 1105 for deleting all rows for which 'accessedFlag' is false.

The algorithm 1100 for cache cleaning is called group replacement. This algorithm is simple to implement and adds no overhead on hit, miss, or update propagation. Based on the replacement policy, a set of "victim" queries are marked for deletion from the cache at block 1103. To ensure that the non-overlapping rows, which belong to only "victim" queries are properly marked, the following steps are carried out. First, an accessed flag, implemented as a control column defined during the creation of local tables, is associated with all cached rows and is set to false at block 1102. Then, non-victim queries are executed in the background at block 1104. This background execution can occur over an extended period to not affect the performance of foreground queries. Whenever a query is executed, the corresponding entry in the control column is set to true for any selected row. At the end of this execution cycle, any rows with the control column (accessed flag) still false can be safely deleted at block 1105. To prevent the deletion of rows inserted or updated by a cache miss or by the consistency manager after the garbage collection cycle has started execution, the control column for any row updated or inserted into local tables is set.

Embodiments of the present disclosure achieve, in one sense, the best of both worlds: the benefits of query response caching, specifically the ease of administration and the ability to adapt to changes in the workload or in resource availability; and the benefits of base table replication, specifically the space efficiency of non-redundant data storage, and the ability to support efficient update-based consistency protocols.

It is therefore an aspect of the present the present disclosure that a local machine is used to satisfy a database query meant for at least one remote server, by employing a caching policy in dynamically caching results of previous queries. It is another aspect of embodiments of the present disclosure that a local database is associated with the local machine, and used to store a plurality of query results in shared tables.

Yet another aspect of embodiments of the present disclosure is to use locally stored query results in satisfying a new query, by employing a containment checker operating on query predicates. The containment checker ensures that the data requested by the new query, as defined by the query predicate, is logically included in the set of data cached in the plurality of cached query results, which is described by the union of the predicates of previous queries.

It is another aspect of embodiments of the present disclosure that data stored in the edge cache is organized into "partial replicas" of tables defined in the origin database, whenever possible. Query results received from the origin server are inserted into the local database. The results of queries made to the same base table are inserted into the same locally cached version of the base table. Yet another aspect of embodiments of the present disclosure is that the results of complex queries, such as queries containing sub queries, aggregations or user-defined functions, where the result is not a simple subset of the rows and columns of the base table, are stored locally as multiple tables, one per result.

Still another aspect of embodiments of the present disclosure is that it is transparent and does not require a change to the application. Also since the caching logic resides outside the database it is compatible with any back-end or local database and does not require changes to the database server. It is another aspect of embodiments of the present disclosure that the consistency of locally cached data is maintained by propagating changes that occur to base tables at the origin to the edge cache, and by employing a consistency-aware algorithm in processing incoming queries. Yet another aspect of embodiments of the present disclosure is that the cache can adjust the amount of space used locally by evicting less useful query results from the local database, without compromising consistency or correctness.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software, for example. Moreover, the software is preferably implemented in firmware tangibly embodied on a program storage unit. The software may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the software, or any combination thereof, which may be executed by the hardware. In addition, various other peripheral units may be connected to the computer platform, such as an additional data storage unit.

It is to be further understood that, because some of the constituent system components and methods showed in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for a local server to satisfy a database query for at least one remote server, the method comprising:

dynamically caching results of previous database queries of the at least one remote server in an edge cache;

associating a local database with the local server;

storing a plurality of the caching results in shared tables in the local database; and using the plurality of the caching results in transparently satisfying a new database query with the local server, wherein the step of storing comprises:

inserting results of simple and Top-N queries over a single database table in shared base tables;

saving results of join queries in shared join tables;

forming a shared table repository including shared base tables and shared join tables;

storing results of complex queries in separate tables one per query result; and forming an exact-match repository from a plurality of the separate tables.

2. A method as defined in claim 1, wherein the step of inserting comprises:

creating a single local table in the edge cache to correspond to a base table in an origin server whenever a simple query is first received to a base table;

inserting results of the simple query in the local table; and inserting results of all subsequent simple queries to the base table in the local table.

3. A method as defined in claim 1, wherein the step of saving comprises:

creating a local join table in the edge cache to correspond to each join condition and table list in a join query; and inserting results of all subsequent join queries over the same table list and having the same join condition in the local join table.

4. A method as defined in claim 2, wherein the step of attempting comprises at least one of:

finding a matching cached query satisfying conditions that a list of columns in a select list of the new query is included in that of a matching query, that a predicate of the new query logically implies that of a predicate of the matching query, and that all columns mentioned in clauses of the new query are included in a select list of the matching query; and finding a set of matching cached queries satisfying conditions that a list of columns in a select list of the new query is included in that of each one of the matching cached queries, that a predicate of the new query logically implies that of a predicate formed by a disjunction of all predicates of the matching cached queries, when all predicates of the matching cached queries are connected by a logical OR operator, and that all columns mentioned in clauses of the new query are included in select lists of each of the matching cached queries.

5. A method for a local server to satisfy a database query from an application for at least one remote server, the method comprising:

dynamically caching results of previous database queries of the at least one remote server in an edge cache comprising an exact-match repository;

associating a local database with the local server;

storing a plurality of the caching results in shared tables comprising a shared-table repository in the local database; and using the plurality of the caching results in transparently satisfying a new database query with the local server, wherein the step of using comprises at least one of:

searching for a response to the new query in the exact-match repository if the new query is complex; and sub-selecting a response to the new query from the shared-table repository if the new query is not complex, wherein the step of searching comprises:

returning a query result in the edge cache corresponding to an SQL string to the application if the SQL string of the new query is found in the exact-match repository;

sending the new query to the remote server if the SQL string of the new query is not found in the exact-match repository;

inserting a received query result in the exact-match repository if the SQL string of the new query is not found in the exact-match repository; and associating the received query result in edge cache with the new query's SQL string if the SQL string of the new query is not found in the exact-match repository.

6. A method as defined in claim 5 wherein the shared table cleaning comprises:

forming a control column in each table from the shared tables;

setting entries in a control column to false;

identifying good queries to be maintained in the shared tables;

marking all entries in the control column corresponding to rows belonging to responses for good queries; and deleting any rows in the shared tables for which the control column entry is still false.

7. A method for a local server to satisfy a database query received from an application for at least one remote server, the method comprising:

dynamically caching results of previous database queries of the at least one remote server in an edge cache comprising an exact-match repository;

associating a local database with the local server;

storing a plurality of the caching results in shared tables comprising a shared-table repository in the local database; and using the plurality of the caching results in transparently satisfying a new database query with the local server, wherein the step of using comprises at least one of:

searching for a response to the new query in the exact-match repository if the new query is complex; and sub-selecting a response to the new query from the shared-table repository if the new query is not complex, wherein the step of sub-selecting comprises:

attempting to prove that a result of the new query's result set is contained in a union of cached query results with a containment checker;

substituting tables mentioned in the new query with local table names if the step of attempting to prove is completed successfully;

evaluating the new query over the shared-table repository if the step of attempting to prove is completed successfully; and counting the number of rows received from the edge cache if the new query is a Top-N query, and if the number of rows do not exceed the number of rows requested by the application, processing by rewriting the new query and generating a rewritten query, sending the rewritten query to the remote server and storing results received from the remote server in the shared-table repository, adding a predicate of the rewritten query to an index of the shared-table repository, evaluating the new query over the shared-table repository, and returning results of the step of evaluating to the application.

8. A method as defined in claim 7, wherein the step of rewriting includes the steps of:

adding primary keys of accessed tables to a select list of the new query;

dropping an aggregation operator from the select list if a resource manager estimates a resulting result set to be not too large or worth caching; and expanding a number of rows (N) requested by the new query to retrieve more rows.

9. A method for a local server to satisfy a database query for at least one remote server, the method comprising:

dynamically caching results of previous database queries of the at least one remote server in an edge cache;

associating a local database with the local server;

storing a plurality of the caching results in shared tables in the local database;

using the plurality of the caching results in transparently satisfying a new database query with the local server;

ensuring delta-consistency of results of previous queries including the steps of:

subscribing an edge cache to refresh messages propagated by an origin server and including updates, deletes and inserts applied to the back-end tables;

applying updates, deletes, and inserts to locally cached tables in a shared-table repository whenever refresh messages are received;

invalidating any shared join tables or tables in an exact-match repository which are referred to in a refresh message as changed;

associating a refresh message timestamp with a refresh message that is equal to the largest timestamp of any transaction whose effects are included in the refresh message;

associating a cached set timestamp with results of previous queries that equals a timestamp of the last refresh message applied to the edge cache;

associating a new query timestamp with a new query;

comparing the new query timestamp with the cached set timestamp;

inserting a response to the new query if the new query timestamp exceeds the cached set timestamp; and retrieving pending refresh messages from the database server if the new query timestamp exceeds the cached set timestamp.

10. A method for ensuring delta-consistency of a set of query results retrieved from a database server, the method comprising the steps of:

dynamically caching results of previous database queries of a remote server in an edge cache;

associating a local database with a local server;

storing a plurality of the caching results in shared tables in the local database;

using the plurality of the caching results in transparently satisfying a new database query with the local server;

subscribing the edge cache to refresh messages propagated by an origin server and including updates, deletes and inserts applied to back-end tables;

applying the updates, deletes, and inserts transparently to locally cached tables whenever refresh messages are received;

associating a timestamp with a refresh message that is equal to the largest timestamp of any transaction whose effects are included in the refresh message;

associating a set timestamp with results of previous queries that equals the timestamp of the last refresh message applied to the edge cache;

associating a new query timestamp with a new query;

comparing the new query timestamp with the set timestamp;

inserting a response to the new query if the new query timestamp exceeds the set timestamp; and retrieving pending refresh messages from the database server if the new query timestamp exceeds the set timestamp.

11. A system comprising a local edge server for dynamic caching of data based on queries performed by a local application and ensuring delta-consistency of a set of query results retrieved from a database server, the system further comprising:

means for dynamically caching results of previous database queries of a remote server in an edge cache;

means for associating a local database with the local server;

means for storing a plurality of the caching results in shared tables in the local database;

means for using the plurality of the caching results in transparently satisfying a new database query with the local server;

means for subscribing the edge cache to refresh messages propagated by an origin server and including updates, deletes and inserts applied to back-end tables, means for applying the updates, deletes, and inserts to locally cached tables whenever refresh messages are received;

means for associating a timestamp with a refresh message that is equal to the largest timestamp of any transaction whose effects are included in the refresh message;

means for associating a set timestamp with results of previous queries that equals the timestamp of the last refresh message applied to the edge cache;

means for associating a new query timestamp with a new query;

means for comparing the new query timestamp with the set timestamp;

means for inserting a response to the new query if the new query timestamp exceeds the set timestamp; and means for retrieving pending refresh messages from the database server if the new query timestamp exceeds the set timestamp.

12. A program storage device readable by a machine, tangibly embodying a program of instructions executable by the machine to perform method steps for dynamic caching of data based on queries performed by a local application and for ensuring delta-consistency of a set of query results retrieved from a database server, the method steps comprising:

dynamically caching results of previous database queries of a remote server in an edge cache;

associating a local database with a local server;

storing a plurality of the caching results in shared tables in the local database;

using the plurality of the caching results in transparently satisfying a new database query with the local server;

subscribing the edge cache to refresh messages propagated by an origin server and including updates, deletes and inserts applied to back-end tables;

applying the updates, deletes, and inserts to locally cached tables whenever refresh messages are received;

associating a timestamp with a refresh message that is equal to the largest timestamp of any transaction whose effects are included in the refresh message;

associating a set timestamp with results of previous queries that equals the timestamp of the last refresh message applied to the edge cache;

associating a new query timestamp with a new query;

comparing the new query timestamp with the set timestamp;

inserting a response to the new query if the new query timestamp exceeds the set timestamp; and retrieving pending refresh messages from the database server if the new query timestamp exceeds the set timestamp.

* * * * *